United States Patent
Stevens et al.

(10) Patent No.: US 7,407,184 B2
(45) Date of Patent: Aug. 5, 2008

(54) MICRO GAS GENERATOR INCLUDING AN INITIATOR BLAST SHIELD

(75) Inventors: Bruce A. Stevens, Oakland, MI (US); Steven M. G. Dunham, Mt. Clemens, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 236 days.

(21) Appl. No.: 10/869,335

(22) Filed: Jun. 15, 2004

(65) Prior Publication Data

US 2005/0017496 A1    Jan. 27, 2005

Related U.S. Application Data

(60) Provisional application No. 60/478,945, filed on Jun. 16, 2003.

(51) Int. Cl.
*B60R 21/26*    (2006.01)
(52) U.S. Cl. .................. 280/736; 280/737; 280/741; 280/807
(58) Field of Classification Search ................ 280/736, 280/740, 741, 807, 742, 737; 297/477; 242/374, 242/375.2, 379.1
See application file for complete search history.

(56) References Cited

U.S. PATENT DOCUMENTS

| | | | |
|---|---|---|---|
| 4,690,063 A | 9/1987 | Granier et al. | ............... 102/530 |
| 5,156,356 A | 10/1992 | Fujimura et al. | |
| 5,403,036 A * | 4/1995 | Zakula et al. | ................ 280/741 |
| 5,765,866 A * | 6/1998 | Canterberry et al. | ........ 280/741 |
| 5,899,399 A * | 5/1999 | Brown et al. | ................. 242/374 |
| 6,012,737 A * | 1/2000 | Van Wynsberghe et al. | .. 280/737 |
| 6,123,359 A * | 9/2000 | Cabrera et al. | .............. 280/741 |
| 6,435,550 B1 * | 8/2002 | Werneth et al. | ............. 280/737 |
| 6,540,256 B2 * | 4/2003 | Iwai et al. | .................... 280/736 |
| 6,553,914 B2 * | 4/2003 | Hosey et al. | ................. 102/530 |
| 6,676,057 B2 | 1/2004 | Maierhofer et al. | |
| 6,823,796 B1 | 11/2004 | Amano | .................. 102/202.14 |
| 6,845,395 B1 * | 1/2005 | Blumenau et al. | ............ 709/223 |
| 6,854,395 B2 | 2/2005 | Katsuda et al. | ............. 102/530 |
| 2002/0113157 A1 | 8/2002 | Kopetzky et al. | |

FOREIGN PATENT DOCUMENTS

WO    WO 01/05633    1/2001

* cited by examiner

*Primary Examiner*—Toan C To
(74) *Attorney, Agent, or Firm*—L.C. Begin & Associates, PLLC.

(57) ABSTRACT

A micro gas generator 10 is provided primarily for supplying and directing gas from the combustion of pyrotechnic materials into a seatbelt pretensioner 26, for example. A perforated housing 12 of gas generator 10 provides a body for containment of the other gas generant constituents, and forms a propellant chamber 14. A propellant or gas generant 16 is contained within chamber 14 and provides combustion thereof. An annular bore 20 is centrally oriented within the bore seal 18 thereby providing a seat for an associated initiator 22. An initiator blast shield 36 is encased about the initiator 22 thereby attenuating or mitigating the force and progression of the combustion of an ignition compound (not shown) within the initiator 22.

19 Claims, 3 Drawing Sheets

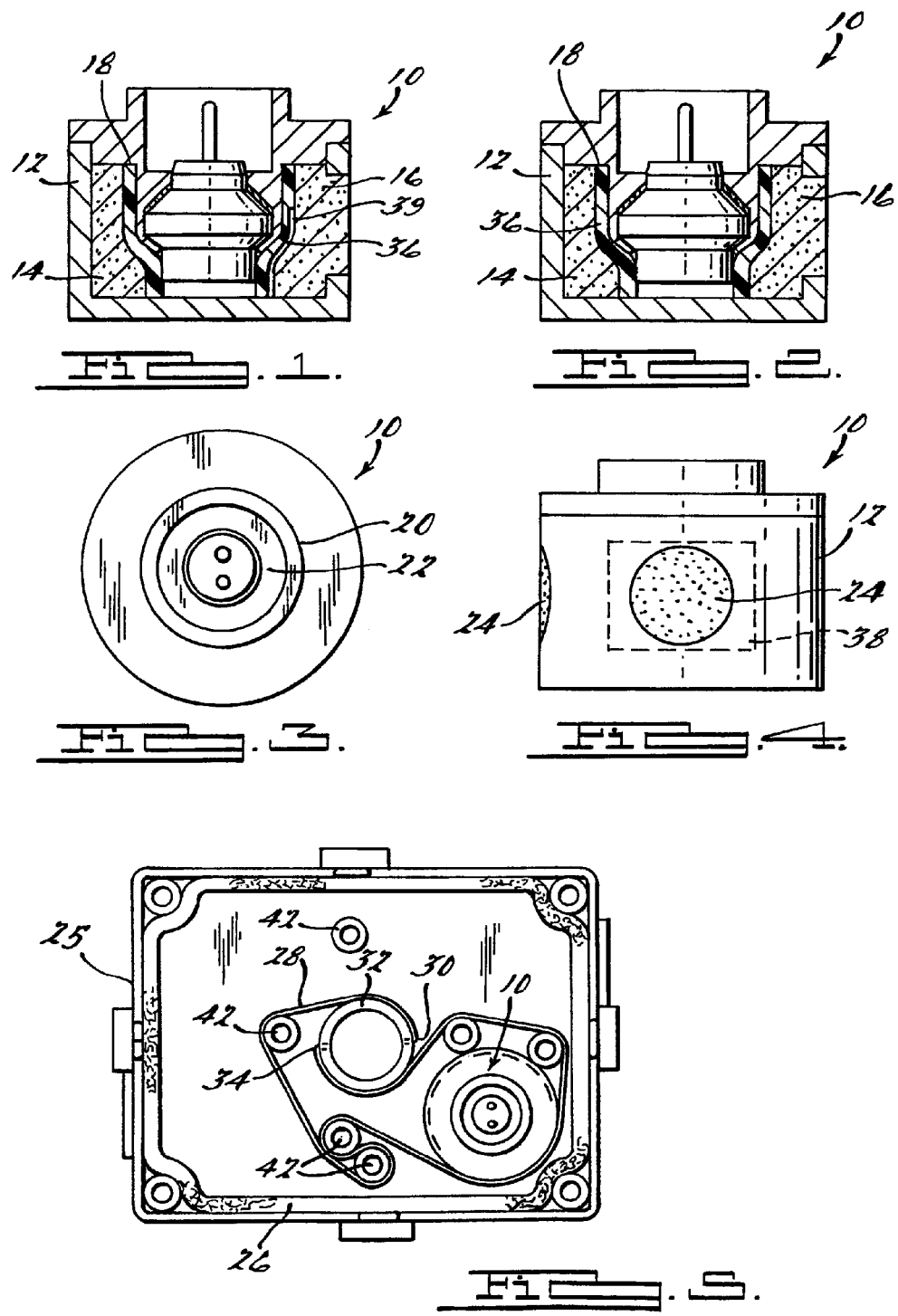

US 7,407,184 B2

MICRO GAS GENERATOR INCLUDING AN INITIATOR BLAST SHIELD

CROSS-REFERENCE TO RELATED APPLICATIONS

This application claims the benefit of U.S. Provisional Application Ser. No. 60/478,945 filed on Jun. 16, 2003.

TECHNICAL FIELD

The present invention relates generally to gas generator devices for restraint systems in automobiles, and relates more particularly to a seatbelt pretensioner incorporating a structure that simplifies tailoring of the associated gas generator output.

BACKGROUND OF THE INVENTION

As part of the overall vehicle occupant protection system, seatbelt assemblies have evolved considerably since their earliest inception. Improvements are continually sought relative to durability, ease of manufacturing, and general cost-effectiveness.

One concern that continues to receive attention is the design of the seatbelt pretensioner. Seatbelt pretensioners generally function in concert with an associated retractor to tension and retract a seatbelt during a crash event. Typically, upon a crash event a pretensioner initiator is used to ignite associated propellant thereby actuating the pretensioner and tensioning the seat belt spooled about a seatbelt retractor in rotatable communication with the pretensioner.

State of the art automotive initiators may be described as exhibiting a non-directional output. As a result, upon activation, the hot gases, flame front, and burning particles of the initiator exhibit a radially extending pattern that is somewhat spherical. In these designs, the explosive output of the initiator impacts the performance of the device associated therewith. For example, many pretensioners once activated must be replaced due to the damage caused by initiator operation. In the past, one proven method to address this concern is to increase or decrease the initiator pyrotechnic load, thereby varying the device's output, respectively. This approach, however is quite time-consuming and expensive. An alternative approach responsive to these concerns would therefore be an improvement in the art.

SUMMARY OF THE INVENTION

The above-referenced concerns are resolved by a gas generator that may tailor gas flow to function as a driving force, within a seatbelt pretensioner, for example. In accordance with the present invention, a micro gas generator contains a perforated housing, an annular bore seal, an initiator assembly housed within the bore seal and within the housing, and a propellant within the housing and ignitably communicating with the initiator assembly. An initiator blast shield at least partially covers the periphery of the initiator assembly insulating the same from the propellant bed. Insulation of the initiator assembly slows the rate of combustion of the propellant relative to the initial blast of the initiator. Stated another way, the initiator blast shield is used to arrest the initial blast of the initiator to result in a more gradual and controlled combustion of the propellant. As such, at least a portion of the total explosive output of the initiator is deflected to targeted areas of the propellant charge. In effect, the initiator blast shield produces a result similar to using a much lower charge mass initiator, without the associated engineering and development costs.

BRIEF DESCRIPTION OF THE DRAWINGS

FIG. 1 is a sectional view of a micro gas generator in accordance with the present invention, whereby the initiator blast shield is shown with a weakened portion.

FIG. 2 is a sectional view of a state of the art micro gas generator in accordance with the present invention, whereby the initiator blast shield contains no weakened portions.

FIG. 4 is a side view of the micro gas generator of FIG. 3. bottom of the pretensioner showing the rotatable constituents that cooperate with a seatbelt retractor.

FIG. 5 is a top view of the micro gas generator showing at least one gas exit aperture along the periphery of the micro gas generator housing.

FIG. 8 is a top view of the micro gas generator of FIG. 5 after pretensioner activation.

DETAILED DESCRIPTION

Figure 6:
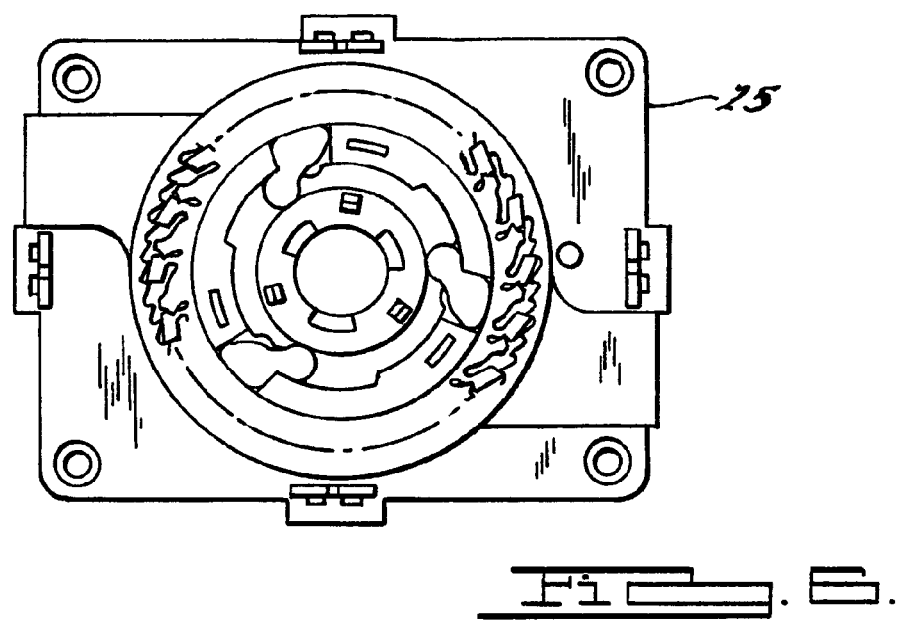
FIG. 6 is a bottom view of the pretensioner showing the rotatable constituents that cooperate with a seatbelt retractor.

Referring to FIG. 1, there is shown a side sectional view of a micro gas generator in accordance with the present invention. A micro gas generator 10 is designed primarily for supplying and directing gas from the combustion of pyrotechnic materials into a seatbelt pretensioner for example, but is not limited thereto. Exemplary, but not limiting pretensioners and seat belt assemblies are described in co-owned U.S. Pat. Nos. 6,419,177, 6,460,794, 6,505,790, and 6,520,443, the teachings of which are herein incorporated by reference.

A housing 12 of gas generator 10 provides a body for containment of the other gas generator constituents, and forms a propellant chamber 14. A propellant or gas generant 16 is contained within chamber 14 and provides gas upon combustion thereof. A bore or chamber seal 18 is press fit, crimped, welded, or otherwise fixed within the generator 10 and about a first end 11 of the housing 12 to seal the chamber 14. An annular bore 20 is centrally oriented within the bore seal 18 thereby providing a seat for an associated initiator assembly 22.

The initiator assembly 22 is crimped or otherwise fixed within bore 20 and further seals chamber 14. The initiator 22, upon receipt of a remote electrical signal from a crash sensor or accelerometer (not shown), for example, ignites the propellant 16. Ignition of the propellant 16 produces gas that in turn propels an associated seat belt retractor driving means within an associated pretensioner. The pretensioner rotatably or otherwise communicates with a seatbelt retractor whereby upon pretensioner activation, the seatbelt retractor is also activated in a known manner.

Referring to FIG. 4 and FIG. 5, the housing 12 contains at least one gas exit orifice and preferably a plurality of gas exit orifices 24 evenly spaced about the circumference or periphery of the housing 12. In one embodiment, the orifices 24 are preferably arranged within an arc preferably spanning no more than half of the circumference or outer area of the housing 12, thereby facilitating a directional pressure based on the orifice orientation. The gases can then be directed toward the retractor driving means or strap whereby the directed gases thereby function as a pretensioner actuator, for example.

FIG. 5 is an exemplary pretensioner 25 in accordance with the present invention and represents a typical environment for operation of the gas generator 10. A pretensioner housing or body 26 houses the micro gas generator 10 wherein gases produced from the gas generator 10 are directionally biased through gas exit orifices 24. The gases exert a driving force against a retractor driving means or metal strap 28. Accordingly, typical piston actuators employed in pretensioners, for example, may be eliminated given that the directed gas of the present micro gas generator 10 effectively functions to drive the retractor driving means in the same manner. A first end 30 of the strap 28 is fixed to an axle or clutch sleeve 32 in rotary communication with an associated seatbelt retractor reel. A second end 34 of the strap 28 is anchored or fixed opposite the first end 30 within the periphery of the clutch sleeve. For example, the clutch sleeve 35 may be formed with opposing slots 37 along the clutch sleeve circumference or periphery. Each opposing slot corresponds to the first and second ends 30 and 34, respectively, thereby facilitating a torque about the clutch sleeve 32 once the pretensioner is activated and the first and second ends 30 and 34 are tensioned to result in the same directional torque about the clutch sleeve 32. As such, tensioning of the strap 28 results in translational rotational energy about the axle 32, thus effecting rotary motion of a seat belt reel and consequently, tensioning of a seat belt attached thereto.

More specifically, a plurality of stanchions or posts 42 are positioned about the clutch sleeve 32 and about the gas generator 12 as support structures for the strap 28. As shown in FIG. 5, the strap 28 is wound about the various posts 42 in serpentine fashion. As shown in FIG. 8, upon gas generator activation, the resultant gases correspondingly bias or tension each end of the strap 28 to achieve either a counterclockwise or a clockwise torque about an axis running through the clutch sleeve 32.

In further accordance with the present invention, an initiator blast shield 36 is encased about the initiator 22 thereby attenuating or mitigating the force and progression of the combustion of an ignition compound within the initiator 22. As a result, combustion of the gas generant 16 is necessarily slowed or modified as per customer design criteria. On the other hand, the length of the blast shield 36 may be shortened to expose more of the gas generant or propellant 16 to the blast from the initiator 22. As a result, the propellant burn is more aggressive and combustion proceeds more rapidly. Additionally, the material of the shield 36 may be varied. A preferred embodiment contains a shield 36 made from a suitable frangible material such as flexible silicone or some other similar polymer. However, the shield 36 may also be made from any other flexible or suitable rigid material such as aluminum, steel, or rubber, for example. Additionally, the shield 36 may be formed with at least one and preferably a plurality of weakened portions 39 such as scores, slots, or cuts that are preferably aligned or generally aligned with the gas exit orifices 24, thereby providing burst points within the shield 36 proximate the orifices 24. In yet another aspect of the invention, when the orifices 24 are spaced circumferentially in an arc that is less than half of the total circumference of the house, directed gas flow may be achieved. A burst shim or tape film 38 is preferably positioned on the periphery of housing 12 over the gas exit apertures 24 thereby providing a seal to maintain the integrity of the propellant 16 prior to activation and also providing for a pressure increase upon combustion of the propellant 16.

All other known constituents of the present invention are made by methods well known in the art. For example, the pretensioner housing 26 may be stamped or forged, or otherwise formed from carbon steel, metal, polymer or some other suitable material. The strap or driving means 28 may be drawn or otherwise formed from carbon steel. The propellant cup or housing 12 may be made from aluminum and drawn, orifice punched, or drilled. The housing 12 could also be formed with stamped stress risers around the periphery. The charge or gas generant composition 16 may be any suitable propellant, nitrocellulose for example, known in the art and preferably consists of a non-azide propellant in tablet form. Exemplary, but not limiting, non-azide compositions are described in U.S. Pat. Nos. 5,872,329, 5,756,929, and 5,386,775, herein incorporated by reference. The bore seal 18 may be made from carbon steel, stainless steel, zinc, aluminum, brass, or from any other suitable metal or alloy. The initiator assembly 22 may be manufactured as known in the art, or may be provided by known suppliers such as Primex Technologies, Inc. of Redmond, Wash. The seat belt assembly in general may be made as known in the art. U.S. Pat. Nos. 6,676,057, 6,419,177, 6,460,794, 6,505,790, 6,520,443, 4,635,964, 4,763,750, and 4,708,367, and U.S. Patent Application Publication No. US 2002/0113157, all incorporated herein by reference, exemplify typical seat belt assemblies and include a seatbelt retractor, associated seatbelt webbing, and a seatbelt pretensioner, although not thereby limited. Of course, in accordance with the present invention, the present improvements, and particularly the initiator blast shield 36, are incorporated in the assembly process of these exemplary assemblies.

In a preferred embodiment, gas generator 10 is assembled by first inserting the propellant 16 within the chamber 14. The initiator assembly 22 is then press fit within the annular bore 20. The initiator bore seal 18 is then slidably oriented or fixed over the initiator 22 within the cup 12 as per design specifications. The bore seal 18 is then press fit, crimped, or otherwise fixed over the propellant cup 12 thereby sealing the inflator. The tape seal 38, made from aluminum tape for example, is then fixed over the orifices 24 to provide an environmental and pressure seal for the gas generator 10.

In the event of an impact, sudden vehicle deceleration, or other desired condition, an electronic signal is preferably sent to igniter 22 from an onboard electronic controller (not shown) in a conventional manner. Igniter 22 subsequently ignites the gas generant tablets 16 located in the chamber 14. Ignition of the gas generant is controlled by initiator blast shield 36 as per design specifications. Accordingly, the blast shield thickness and/or length as it extends over the initiator assembly 22 may be altered to increase or decrease the buffering effect of the initiator 22 blast upon actuation thereof. Further, when perforations or cuts are employed on the initiator blast shield 36, the size and number of perforations or cuts may be tailored to accommodate a relatively slower or faster rupture of the shield 36 thereby tailoring the burn rate of the gas generator 10 for the associated operating device. Stated another way, the force resulting from the initiator combustion products may be modified as it passes from the initiator bed to the propellant bed for combustion thereof. As such, the force may be effectively increased if focused at targeted portions of the propellant bed, or, the force may be effectively decreased by muffling the force of the initiator blast through maximizing the extent to which the initiator blast shield 36 encapsulates the initiator 22. When the internal gas pressure has risen to a sufficient level, it ruptures burst shim 38 in a conventional manner. Thenceforth, the gas flows through the orifices 24 into the pretensioner 26 to facilitate rotary communication of a seatbelt retractor associated therewith, and ultimately to facilitate pretensioning of a seatbelt wound about the retractor spool.

In yet another aspect of the invention, a method of modifying the initiator blast and of directing gas flow is described. A housing is provided, whereby at least one gas exit orifice and preferably a plurality of gas exit orifices are formed in the housing. An initiator blast shield is encased about at least a portion of the initiator thereby insulating the propellant from the initiator and modifying the force of the initiator combustion products as it passes through the initiator blast shield and into the propellant. An initiator or igniter is then fixed within the housing to ignite the propellant upon actuation of the gas generator. If desired, the initiator blast shield may be scored or otherwise perforated to weaken one or more portions therein.

Figure 7:
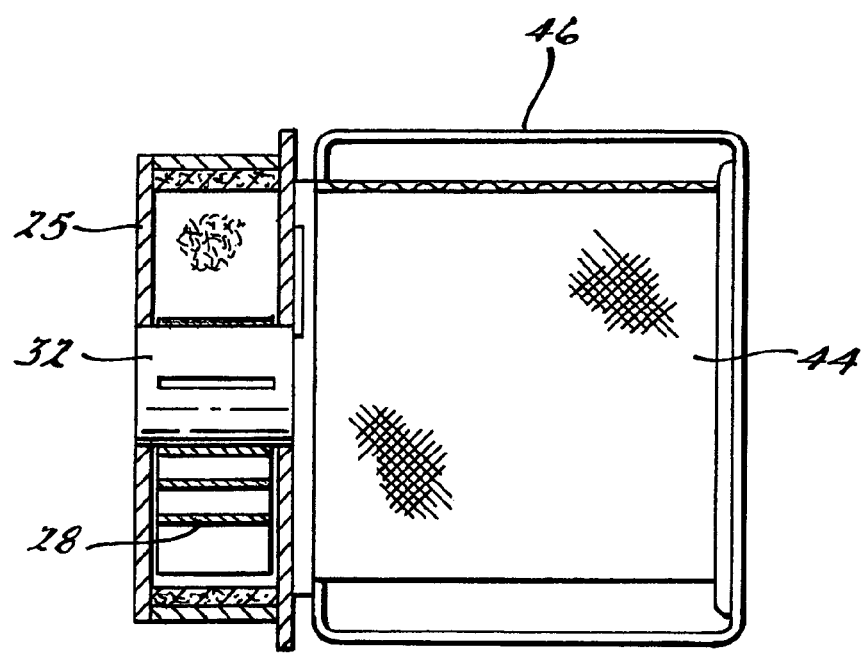
FIG. 7 is a side schematic of a seatbelt assembly including a pretensioner, a retractor, and a spooled seatbelt.
Figure 3:
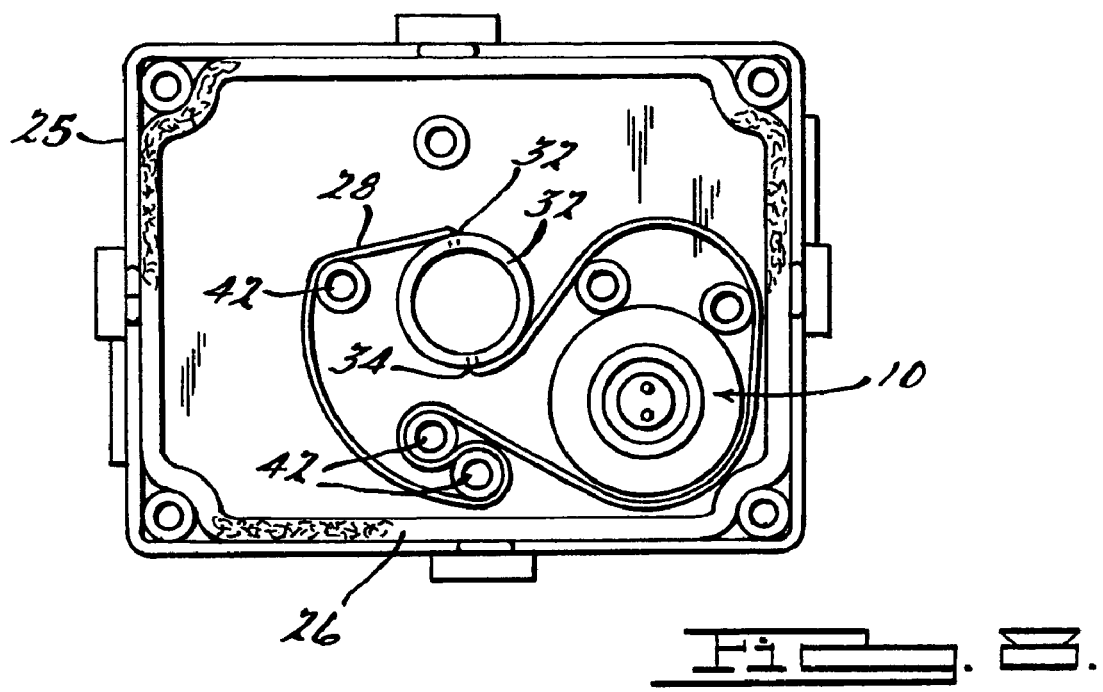
FIG. 3 is a top view of an exemplary micro gas generator in accordance with the present invention.

In yet another aspect of the invention, a seatbelt device 45 shown in FIG. 7 includes a gas generator 10 of the present invention housed within the pretensioner 25. A seatbelt retractor 46 contains a seatbelt spool 44 wherein the seatbelt spool 44 rotatably communicates with the pretensioner 25 during a crash event. The overall performance and cost of seatbelt assembly or device 45 is improved by the ability to tailor the gas generator 10 output with the use of an initiator blast shield 36.

The present description is intended for illustrative purposes only, and should not be construed to limit the breadth of the present invention in any way. Thus, those skilled in the art will appreciate that various modifications, additions, and alterations to the presently disclosed embodiments might be made without departing from the invention's intended scope as defined in the appended claims.

We claim:

1. A seatbelt device comprising:
   a seatbelt refractor comprising a spool;
   a seatbelt wound about said spool; and
   a seatbelt pretensioner comprising a gas generator, wherein said gas generator comprises a perforated housing having a first end, a second end, a circumference about said housing, and a plurality of gas exit orifices spaced circumferentially about said housing, said gas exit orifices spanning an arc less than half of said circumference to provide a directed gas flow from the housing;
   a propellant contained within said housing;
   an initiator fixed within said first end to ignite said propellant upon actuation of said pretensioner; and
   an initiator blast shield fixed about said initiator thereby insulating said propellant from said initiator, whereby upon activation of said pretensioner, said initiator produces pressurized combustion products within said initiator blast shield, said shield employed to modify the force of the initiator combustion products as it passes into the propellant for combustion thereof.

2. The seatbelt device of claim 1 wherein the blast shield has a plurality of portions adapted for facilitating localized passage of initiator combustion products therethrough upon activation of the initiator, to modify the force of the initiator combustion products as they pass into the propellant for combustion thereof, each of said blast shield portions corresponding to and being aligned with a respective gas exit orifice of said plurality of gas exit orifices.

3. The seatbelt device of claim 1 wherein said initiator blast shield is formed from polymer.

4. The seatbelt device of claim 3 wherein said initiator blast shield is formed from silicone.

5. The seatbelt device of claim 1 wherein said initiator blast shield is formed from rubber.

6. The seatbelt device of claim 1 wherein said initiator blast shield is formed from a metal.

7. The seatbelt device of claim 6 wherein said initiator blast shield is formed from steel, aluminum, or a metal alloy.

8. The seatbelt device of claim 2 wherein at least one portion of the plurality of portions adapted for facilitating localized passage of initiator combustion products therethrough comprises a weakened portion of the blast shield for promoting fracture thereof.

9. The seatbelt device of claim 1 wherein the plurality of portions adapted for facilitating localized passage of initiator combustion products therethrough comprise a plurality of weakened portions.

10. A gas generator comprising:
    a housing having a first end, a second end, and a plurality of gas exit orifices formed therealong;
    at least one gas exit orifice formed in said housing;
    a propellant contained within said housing;
    an initiator fixed within said first end to ignite said propellant upon actuation of said gas generator; and
    an initiator blast shield fixed about said initiator thereby insulating said propellant from said initiator,
    the blast shield having a plurality of portions adapted for facilitating localized passage of initiator combustion products therethrough upon activation of the initiator, to modify the force of the initiator combustion products as they pass into the propellant for combustion thereof,
    each of said blast shield portions corresponding to and being aligned with a respective gas exit orifice of said plurality of gas exit orifices,
    whereby upon actuation of said gas generator, said initiator produces combustion products within said initiator blast shield.

11. The gas generator of claim 10 further comprising:
    a circumference about said housing; and wherein the plurality of gas exit orifices is spaced circumferentially about said housing, said gas exit orifices spanning an arc less than half of said circumference thereby providing a directed gas flow.

12. The gas generator of claim 10 wherein said initiator blast shield is formed from a polymer, a rubber, or a metal.

13. The gas generator of claim 10 wherein at least one portion of the plurality of portions adapted for facilitating localized passage of initiator combustion products therethrough comprises a weakened portion.

14. The gas generator of claim 11 wherein the plurality of portions adapted for facilitating localized passage of initiator combustion products therethrough comprise a plurality of weakened portions.

15. The gas generator of claim 12 wherein said initiator blast shield is formed from silicone.

16. A method of tailoring an output of a gas generator comprising:
    providing a housing having a circumference;
    forming a plurality of gas exit orifices spaced circumferentially about the housing, wherein the gas exit orifices span an arc less than half of the circumference thereby providing a directed gas flow;
    providing a propellant contained within the housing;
    fixing an initiator within the housing to ignite the propellant upon actuation of the gas generator, and
    providing an initiator blast shield encased about at least a portion of the initiator thereby insulating the propellant from the initiator and modifying the force of the initiator combustion products as it passes through the initiator blast shield and into the propellant.

17. The method of claim 16 further comprising the step of: weakening at least one portion on the initiator blast shield to promote rupture thereof.

18. The method of claim 16 further comprising the steps of:
providing a plurality of portions of the blast shield adapted for facilitating localized passage of initiator combustion products therethrough upon activation of the initiator; and
aligning the plurality of portions of said blast shield in correspondence with the at least one gas exit orifice in the housing.

19. The method of claim 18 wherein the step of providing a plurality of portions of the blast shield adapted for facilitating localized passage of initiator combustion products therethrough upon activation of the initiator further comprises the step of forming a plurality of weakened portions, each weakened portion corresponding to and aligned with a respective gas exit orifice of the plurality of gas exit orifices to provide directed gas flow.

* * * * *

UNITED STATES PATENT AND TRADEMARK OFFICE
CERTIFICATE OF CORRECTION

PATENT NO.        : 7,407,184 B2
APPLICATION NO. : 10/869335
DATED             : August 5, 2008
INVENTOR(S)       : Stevens et al.

Page 1 of 1

It is certified that error appears in the above-identified patent and that said Letters Patent is hereby corrected as shown below:

Column 3; Line 47; delete "bum" and insert --burn--

Column 5; Claim 1; Line 35; delete "refractor" and insert --retractor--

Signed and Sealed this

Fourteenth Day of October, 2008

JON W. DUDAS
*Director of the United States Patent and Trademark Office*